Oct. 23, 1956 J. J. COSGROVE 2,767,585
TANK GAUGE
Filed Feb. 1, 1954 3 Sheets-Sheet 2
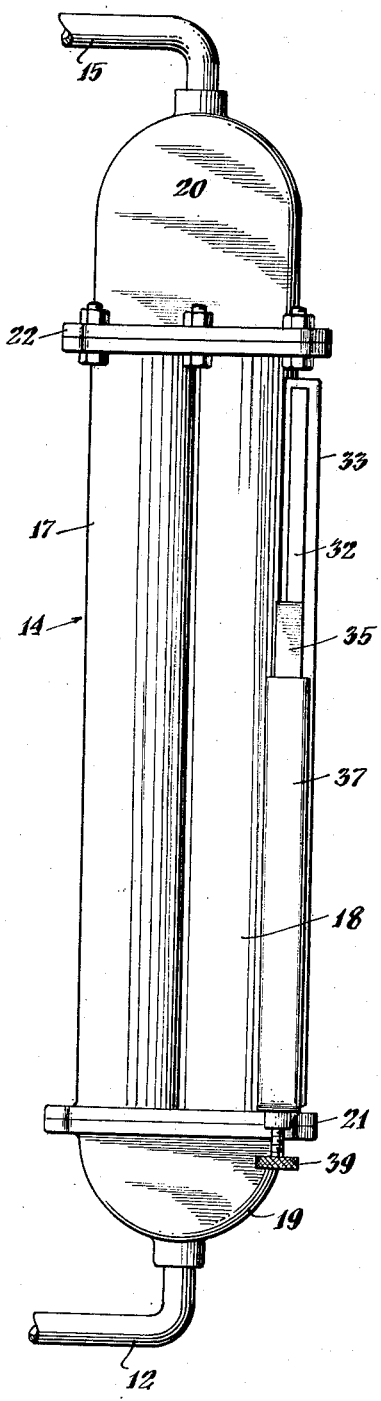
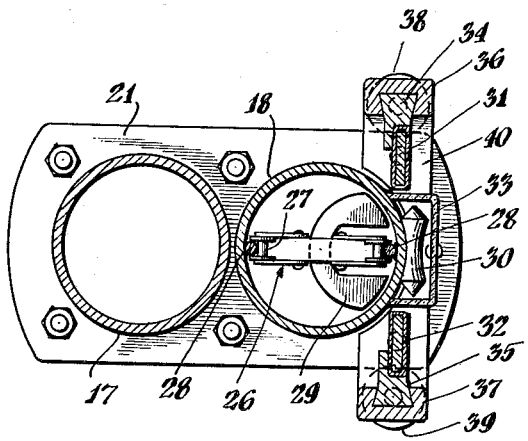
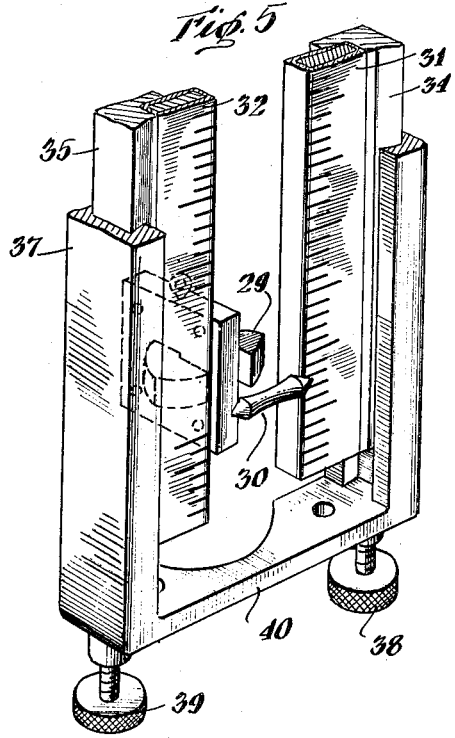
INVENTOR
John J. Cosgrove
BY
Kane, Dalsimer and Kane
ATTORNEYS Oct. 23, 1956  J. J. COSGROVE  2,767,585
TANK GAUGE Filed Feb. 1, 1954  3 Sheets-Sheet 3

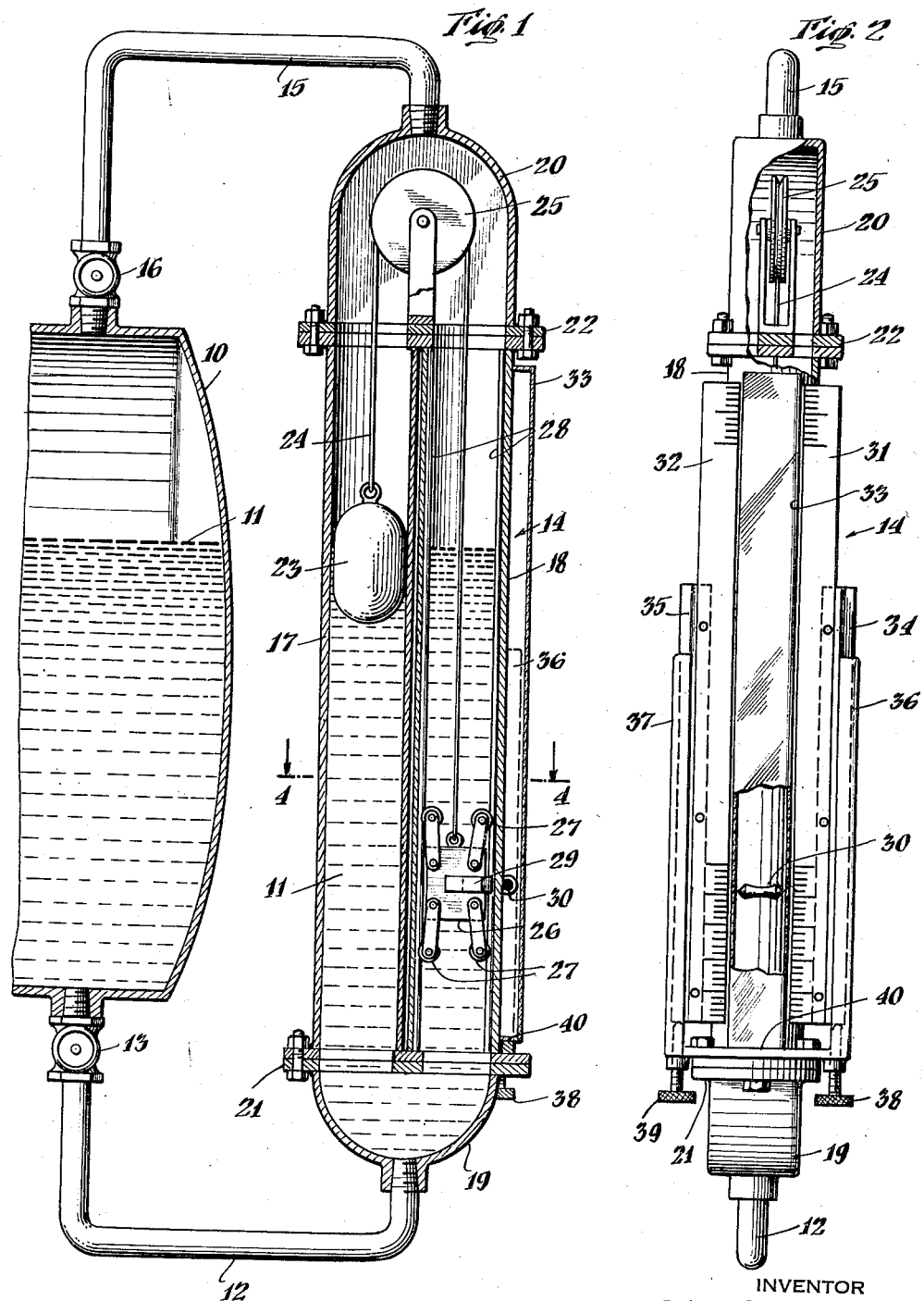

INVENTOR
John J. Cosgrove
BY
Kane, Dalsimer and Kane
ATTORNEYS

United States Patent Office 2,767,585
Patented Oct. 23, 1956

2,767,585

TANK GAUGE

John J. Cosgrove, Greenvale, N. Y., assignor to Liquidivision Gauge & Control Corp., Oceanside, N. Y., a corporation of New York Application February 1, 1954, Serial No. 407,411

4 Claims. (Cl. 73—321)

This invention relates to an improved tank gauge for measuring and indicating the quantity of liquid in a tank.

While my invention is applicable to all types of tanks it is particularly applicable to closed containers where for one reason or another it is necessary or desirable to seal or protect the liquid in the tank from the atmosphere. As an example, my gauge may be used for showing the liquid level in closed containers operating under pressure or vacuum. In this connection my gauge is particularly applicable to measuring liquified gases or liquids of light specific gravity stored in closed containers.

It is an object of the present invention to provide an improved tank gauge of the above type which is accurate, which is light in weight, which is of relatively simple and sturdy construction so that it will give satisfactory service over a long period of time and in which the exposed, moving parts are protected against foreign particles and corrosion.

A further object is the provision of an improved gauge of the above character which may be readily adjusted to meet different conditions of installation.

A further object includes the provision of an improved liquid tank gauge which may be positioned immediately adjacent the tank or which may be located a short distance from the tank as, for instance, the tank may be located inside a building and the gauge outside the building.

Other objects will be apparent from the following detailed description of the drawings in which Fig. 1 is a sectional view in side elevation showing my improved gauge together with the tank to which it is applied;

Fig. 2 is a front elevational view of the gauge with portions of the upper housing broken away so as to show the sheave and the cable for supporting the float and carriage assembly;

Fig 3 is a side elevational view of the gauge;

Fig. 4 is a cross-sectional view on the line 4—4 of Fig. 1;

Fig. 5 is a detailed view in perspective showing the lower portion of the scale, the scale mounting and the adjusting screws.

Figure 6:
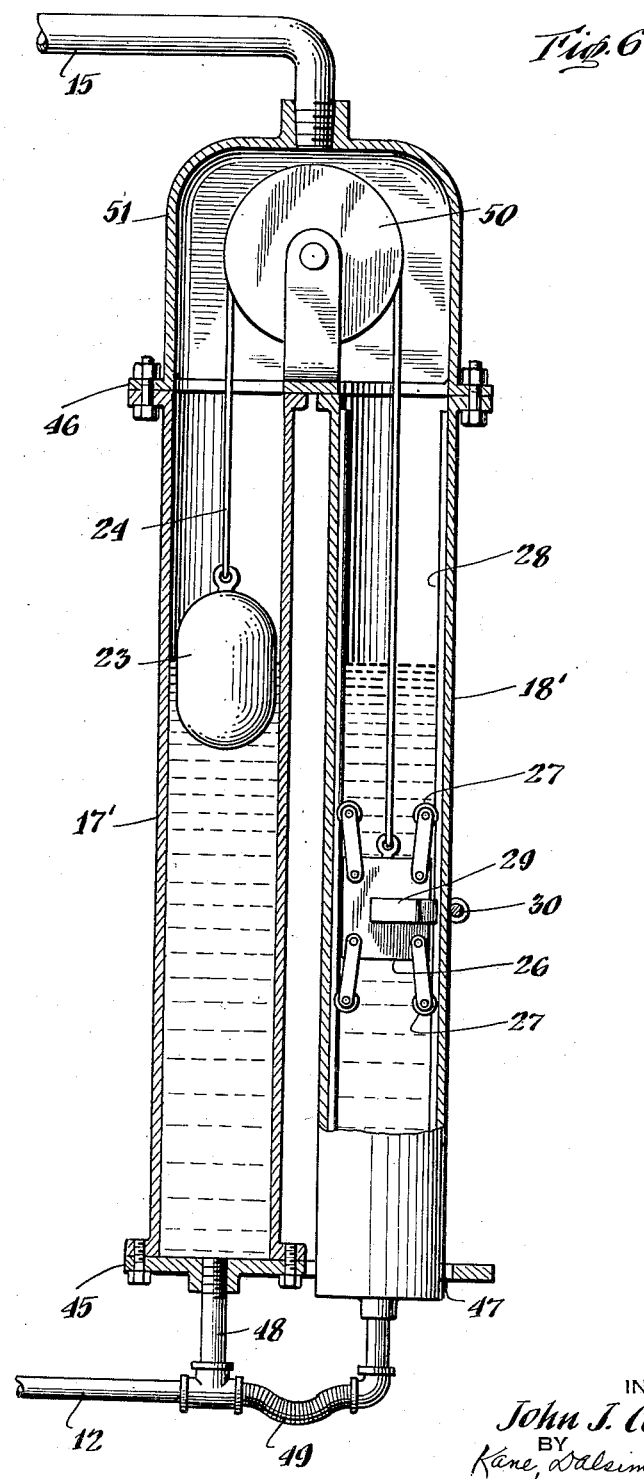
Fig. 6 is a sectional view in side elevation of a modified form of my tank gauge embodying the invention.

My improved gauge consists essentially of a housing connected to the tank to be measured so that the liquid level of the housing varies with the liquid level in the tank. A float in the housing is connected by a flexible cable to a shiftable carriage which serves as a counterweight for the float and which carries a magnet operating a pointed roller located outside of the housing and cooperating with a scale to indicate the liquid level in the tank.

In Fig. 1 the numeral 10 indicates a conventional tank for holding a liquid 11 of any type normally stored in a tank but for the purposes of this invention is preferably a liquid normally stored under vacuum or pressure as, for instance, a liquifiable gas or a liquid of light specific gravity as mentioned above. The bottom of the tank is connected by pipe 12, controlled by valve 13, to the lower end of my improved gauge indicated generally at 14. The upper end of the gauge is connected by pipeline 15, having valve 16 therein, to the space above the liquid in tank 10. Due to pipeline 15, the pressure in the upper part of the gauge will accurately reflect the level of the liquid in the tank.

In the form of my invention shown in Figs. 1 to 5 inclusive, I have shown the gauge as consisting of a housing in the form of two columns, namely, a float column 17 and a carriage column 18 interconnected at their lower end by header 19 and at their upper end by header 20. As shown in the drawings the connection between the columns and headers may be made in any suitable manner as, for instance, by the bolting flanges 21 and 22. The columns 17 and 18 are of tubular construction and open at their upper and lower ends so as to communicate with the headers. Thus, the level of the liquid 11 in the two columns is the same as the liquid level in tank 10. By providing columns 17 and 18, the total weight of the gauge can be reduced, since smaller tubing can be used. The columns should be longer, i. e., of greater vertical dimension, than the tank 10 so that the entire contents of the tank can be measured without any float loss.

In the float column I provide a suitable float 23, preferably made of a non-magnetic material which is corrosion resistant to the liquid and gas contained in the system and which is connected by flexible cord or cable 24 extending over sheaves 25 to the shiftable carriage 26, also preferably made of non-magnetic material. The float is preferably spherical in shape, or at least has spherical ends, so as to eliminate the possibility of jamming or sticking to the walls of the float columns.

The carriage is provided with a plurality of guide rollers 27 which engage with vertically disposed tracks 28 in the form of fixedly mounted cables so as to guide the vertical shifting of the carriage, prevent twisting or rotation thereof and so as to maintain the poles of the magnet in proper juxtaposition with the side wall of the column 18. Carried by the carriage is the permanent magnet 29 whose two poles project towards and are in close proximity to the side wall of column 18 so as to control the position of the roller provided on the outside of the column.

The carriage assembly 26 and float 23 should be so arranged as to act as counterweights for each other with the float 23 being ony slightly heavier than the carriage assembly. Under this arrangement, as the liquid level goes down the float will travel downwardly with the liquid, pulling the carriage upwardly. As the liquid level rises the float will move upwardly with the liquid permitting the carriage to move downwardly. With the float and carriage assembly thus substantially counterbalanced it is only necessary for the system to overcome the relatively slight friction of the sheave 25 and the rollers 27. This is particularly advantageous in the gauging of very light liquids and helps to insure accuracy since the amount of lift required for the float will be very small. By mounting the magnet on the carriage and substantially counter-balancing the float and carriage assembly, the load on the sheave 25 is reduced as compared with a system where the magnet is mounted on the float. Due to the fact that the carriage assembly is of relatively small size, as shown, only a small quantity of liquid is displaced as the carriage is submerged and this has but slight effect on the weight of the carriage.

As the carriage 26 with magnet 29 supported thereon moves up and down in response to variations in the liquid level, the magnet causes a suitable indicator or pointer, preferably in the form of a roller suitably pointed and shaped, to move upwardly and downwardly therewith on the outer surface of column 18. In this connection, the column 18 should be made of a non-magnetic material such as brass or non-magnetic stainless steel, whereas the roller should be made of a magnetic material such as iron or steel readily capable of conveying lines of force between the poles of magnet 29. The roller is located within the field of the magnet so as to be positioned thereby.

Any desired form of roller made of magnetic material may be used as the indicator. In the present embodiment of my invention, I prefer to employ an elongated roller 30 which is longitudinally concave and is pointed at the two ends so that the two ends serve as pointers cooperating with the scales 31 and 32. The concave configuration of the roller pointer 30 preferably conforms with the curvature of column 18 as most clearly is shown in Fig. 4. It will thus be seen that a longitudinal strip of the column serves as a raceway for the roller.

In order to protect the roller and raceway from dust, lint, grit, oil vapor, contaminating materials, ice, corrosion or the like I preferably encase it in a sealed housing 33 made of transparent material such as a suitable plastic or glass. The housing is preferably filled with an inert gas such as nitrogen, to further protect the raceway and the roller from contamination, corrosion or the like.

The two scales 31 and 32 may be made of any suitable material. In the illustrated embodiment they are shown as being made of metal coated with a protective plastic covering so that the scales will not corrode or rust. Due to the plastic coating, the scales may be cleaned and freed of ice without marring the graduations. Suitable markings are provided on the scales. Thus, one scale may be calibrated in linear measure or one scale may be calibrated in the metric system, while the other scale may be calibrated in feet and inches. At the midpoint, where the float and carriage are suspended at the same level, a suitable space may be left in the scale to compensate for the slight difference in weight of the carriage when it is submerged in the fluid.

The scales are fixedly mounted respectively on the frames 34 and 35 which, in turn, are slidably mounted in the longitudinally extending brackets 36 and 37 on the two sides of housing 33. Adjusting screws 38 and 39 are threaded to the connecting frame 40 between the brackets 36 and 37 and the upper ends of these adjusting screws engage the lower ends of the frames 34 and 35 so that they may be adjusted upwardly and downwardly, to meet the particular conditions of the installation.

It will thus be seen that when my improved tank gauge is assembled and connected to a tank in the manner shown in Figs. 1 through 5 the liquid level in the tank 10 will be accurately reflected in the column 17 with the result that the float 23 will cause carriage 26 to shift to a position whereby magnet 29 will cause roller 30 to accurately indicate the amount of liquid contents on the scales 31 and 32. Any change in the liquid level causes the float, carriage, magnet and roller 30 to immediately shift to reflect that change.

Due to the fact that the carriage assembly and float 23 are substantially counter-balanced, the gauge works accurately even where light liquids are involved since it is only necessary to overcome the very minor friction of sheave 25 and rollers 27.

As previously explained, the two columns are of greater vertical dimension than the tank and, accordingly, will measure the entire contents of the tank without any float loss. By providing two columns instead of one, smaller gauge tubing may be employed which results in reduced weight. The spherical configuration of the float prevents sticking and jamming and due to the fact that it is made of non-magnetic material, it will not be subjected to electrical or magnetic interference.

Due to the fact that the space above the liquid in tank 10 and the upper part of the gauge are connected together by pipe 15 it will be appreciated that my gauge is suitable for use with closed containers operating under either pressure or vacuum. Where it is used with a pressure system the float 23 may be filled with a gas of substantially corresponding pressure. Similarly, where the gauge is used with a system operating under vacuum, the pressure in the float may be reduced to a substantially corresponding level. Due to the fact that the raceway in which the roller operates is completely protected, contaminating particles and corrosion cannot interfere with the accurate operation of the roller. Also, due to the fact that the scales 31 and 32 are protected by a plastic coating, corrosion will not interfere with the clarity of the calibrations or the accuracy thereof and they may be readily cleaned and de-iced.

In addition to indicating the calibrated quantities on the scales 31 and 32, it will be appreciated that the roller 30 may also operate signals or initiate any desired sequential operation. Thus, contacts which will be bridged by the roller may be provided in the raceway or microswitches may be located at suitable points in the raceway to be actuated by the roller.

As previously pointed out, column 18 should be made of a non-magnetic material such as brass, whereas column 17 can be made of a magnetic material such as steel. Where the columns are made of metals having substantially different coefficients of expansion and where the gauge is located at a point having substantial fluctuations in temperature, I preferably mount the two columns so one column may have relative elongation with respect to the other. One such arrangement is shown in Fig. 6 in which float column 17' is fixedly connected to the two mounting flanges 45 and 46. The carriage column 18' however is only fixedly connected to the upper mounting flange 46 and passes through an aperture 47 in the lower mounting flange so as to be shiftable with respect thereto. The aperture 47 may be of such a size to guide the relative movements of column 18' or a clamp or gasket may be mounted in the aperture for this purpose.

The pipeline 12 which leads from the tank is connected by pipe 48 to the lower end of float column 17' and by flexible steel tube 49 to the lower end of carriage column 18'. Thus, under different thermal conditions one column can have relatively greater expansion than the other column without straining or distorting the parts thereof.

As in the first form of my invention, the float 23 is disposed in the float column 17' and floats on the liquid therein and is connected by flexible cable 24 extending over sheave 50 mounted in header 51 to the shiftable carriage 26. The carriage 26 is mounted and guided in the carriage column 28 in the same manner as in the first form of my invention and carries a magnet 29 which controls the roller or pointer 30.

The operation of the gauge shown in Fig. 6 is similar to that shown in the first form of my invention with the exception that the two columns can readily expand and contract varying amounts with respect to each other under different thermal conditions without setting up any stresses or strains in the apparatus. The header 51 is connected by the pipeline 15 to the space above the liquid in the tank which is being gauged.

From the foregoing it will be seen that I have provided an improved tank gauge which may be used in connection with all types of tanks for gauging various types of liquids but is particularly suitable for use with closed containers for gauging liquids under pressure or vacuum.

It will also be seen that the gauge is accurate due, in part, to the arrangement and configuration of the counter-balancing float and carriage and also due to the connection provided between the upper portion of the gauge and the upper portion of the tank. In addition, the roller pointer and raceway are protected from contaminants and corrosion and the scales are provided with a protective coating which prevents corrosion and permits cleaning and de-icing without marring.

It should be understood that while I have shown two embodiments of my invention that modifications may be made therein without departing from the invention as set forth in the accompanying claims.

I claim:

1. A gauge for measuring the quantity of liquid in a tank comprising: a first vertically disposed tubular column; a second vertically disposed tubular column; means for connecting the lower portions of the two columns to the lower portion of the tank so that liquid from the tank may enter the columns; means providing communication between the upper ends of the columns; means for connecting the upper portion of the two columns with the upper portion of the tank; a vertically shiftable float in the first column; a vertically shiftable carriage assembly including a magnet disposed in the second column, said magnet having poles disposed adjacent the wall of said second column; an elongated flexible connecting member extending over the supporting means and connected adjacent its opposite ends to the float and carriage respectively whereby they may shift vertically in opposite directions with respect to each other, said float and carriage assembly being of substantially equal weight and serving to counter-balance each other; and shiftable indicator means made of magnetic material and disposed outside the second column immediately adjacent the poles of the magnet and in the magnetic field thereof so as to be shiftable thereby.

2. A gauge for measuring the quantity of liquid in a tank as set forth in claim 1 in which the wall of the second column along which the carriage assembly shifts is made of non-magnetic material and forms a raceway for the indicator means.

3. A gauge for measuring the quantity of liquid in a tank as set forth in claim 1 in which the wall of the second column along which the carriage assembly shifts is made of non-magnetic material and forms a raceway for the indicator means and a sealed houring made of transparent material and filled with an inert gas is provided over said indicator and raceway.

4. A gauge for measuring the quantity of liquid in a tank as set forth in claim 1 in which the two columns are made of two different materials having different coefficients of expansion and are fixedly mounted with respect to each other adjacent one end but are free for relative movement at the opposite end.

References Cited in the file of this patent

UNITED STATES PATENTS

| 42,690 | Sheffler | May 10, 1864 |
| 1,379,271 | Malinowsky | May 24, 1921 |
| 2,556,346 | Stromberg | June 12, 1951 |

FOREIGN PATENTS

| 269,782 | Great Britain | Apr. 28, 1927 |